US006227582B1

United States Patent
Ichien

(10) Patent No.: US 6,227,582 B1
(45) Date of Patent: May 8, 2001

(54) BUMPER BEAM AND BUMPER SYSTEM FOR VEHICLE

(75) Inventor: Takamitsu Ichien, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/565,847

(22) Filed: May 5, 2000

(30) Foreign Application Priority Data

May 14, 1999 (JP) ................................................ 11-133987

(51) Int. Cl.[7] .................................................. B60R 19/02
(52) U.S. Cl. ............................................. 293/132; 293/133
(58) Field of Search .................................... 293/132, 133, 293/102, 120; 296/189, 188; 188/371, 377

(56) References Cited

U.S. PATENT DOCUMENTS

| 3,883,168 | * | 5/1975 | Goupy et al. ........................ 293/120 |
| 3,997,207 | * | 12/1976 | Norlin ............................... 293/133 X |
| 4,597,601 | * | 7/1986 | Manning ........................... 293/133 X |
| 5,201,912 | * | 4/1993 | Terada et al. ..................... 293/133 X |
| 5,785,367 | * | 7/1998 | Baumann et al. .................. 293/133 |
| 6,000,738 | * | 12/1999 | Stewart et al. .................... 293/120 X |

FOREIGN PATENT DOCUMENTS

| 1045183 | * | 12/1978 | (CA) .................................... 293/120 |
| 5178144 | | 7/1993 | (JP) . |
| 5278537 | | 10/1993 | (JP) . |

* cited by examiner

Primary Examiner—Joseph D. Pape
(74) Attorney, Agent, or Firm—Martin A. Farber

(57) ABSTRACT

A vehicular bumper beam having a box-like closed cross section comprises a front wall, a rear wall, a plurality of horizontal walls connecting the front wall and the rear wall. A thickness in the neighborhood of a center of the horizontal walls is designed to be smaller than a thickness in the neighborhood of connecting points of the horizontal walls with the front wall and the rear wall, respectively.

8 Claims, 7 Drawing Sheets

BUMPER BEAM AND BUMPER SYSTEM FOR VEHICLE

BACKGROUND OF THE INVENTION

1. Field of the Invention

The present invention relates to a bumper beam and a bumper system for a vehicle.

2. Background Art

Japanese Patent Applications Laid-open No. Toku-Kai-Hei 5-178144 or No. Toku-Kai-Hei 5-278537 disclose vehicular bumper beams formed by extruded material of aluminum. FIG. 8 is a schematic view showing the construction of an example of these bumper beams. This bumper beam 70 is formed by a plurality of box-like closed cross sections 72 and every wall constituting the bumper beam 70 has a uniform wall thickness T. In an event of collision, the impact load inputted from the front of the vehicle is absorbed by the buckling deformation of wall sections of the bumper beam 70.

However, in an actual collision, the vehicle does not always take a desirable attitude for impact absorption. Further, the input direction of impact energy differs in every specific event of collision. Therefore, in some case of collision, the buckling deformation is inadequate and rather, for example, the bumper beam is deformed to a rhomboid configuration. This inadequate buckling deformation makes it difficult to absorb the impact energy efficiently.

SUMMARY OF THE INVENTION

It is an object of the present invention to provide a bumper beam having such a structure as always generating a stable buckling deformation.

A bumper beam having a box-like closed cross section comprises a front wall, a rear wall, a plurality of horizontal walls connecting the front wall and the rear wall and at least one of said horizontal walls having a smaller thickness in the neighborhood of a center thereof than a thickness in the neighborhood of connecting points thereof with the front wall and the rear wall respectively.

DETAILED DESCRIPTION OF THE INVENTION

Figure 1:
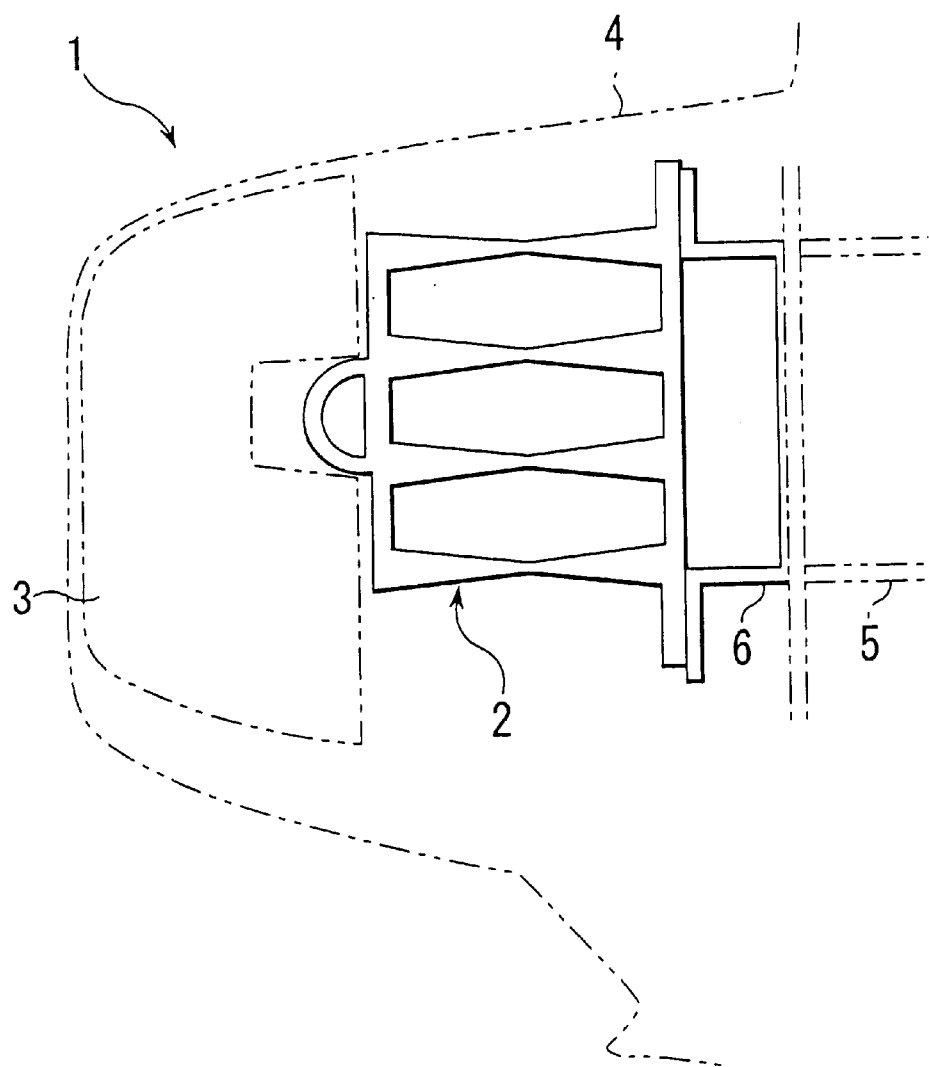
FIG. 1 is a sectional view showing a bumper system according to an embodiment of the present invention.

Referring now to FIG. 1, a bumper system 1 comprises a bumper beam 2 formed by lightweight aluminum, an urethane foam 3 which is an energy absorbing medium and a fascia 4 which is fitted over the urethane foam 3, and which is made of synthetic resin. The bumper beam 2 extending in a transverse direction of the vehicle is attached to a beam stay 6 fixed to a body frame. The urethane foam 3 is provided at the front of the bumper beam 2 so as to absorb impact energy imparted from the front of the vehicle to some extent. The fascia 4 is secured to the body frame 5 and the bumper beam 2.

Figure 2:
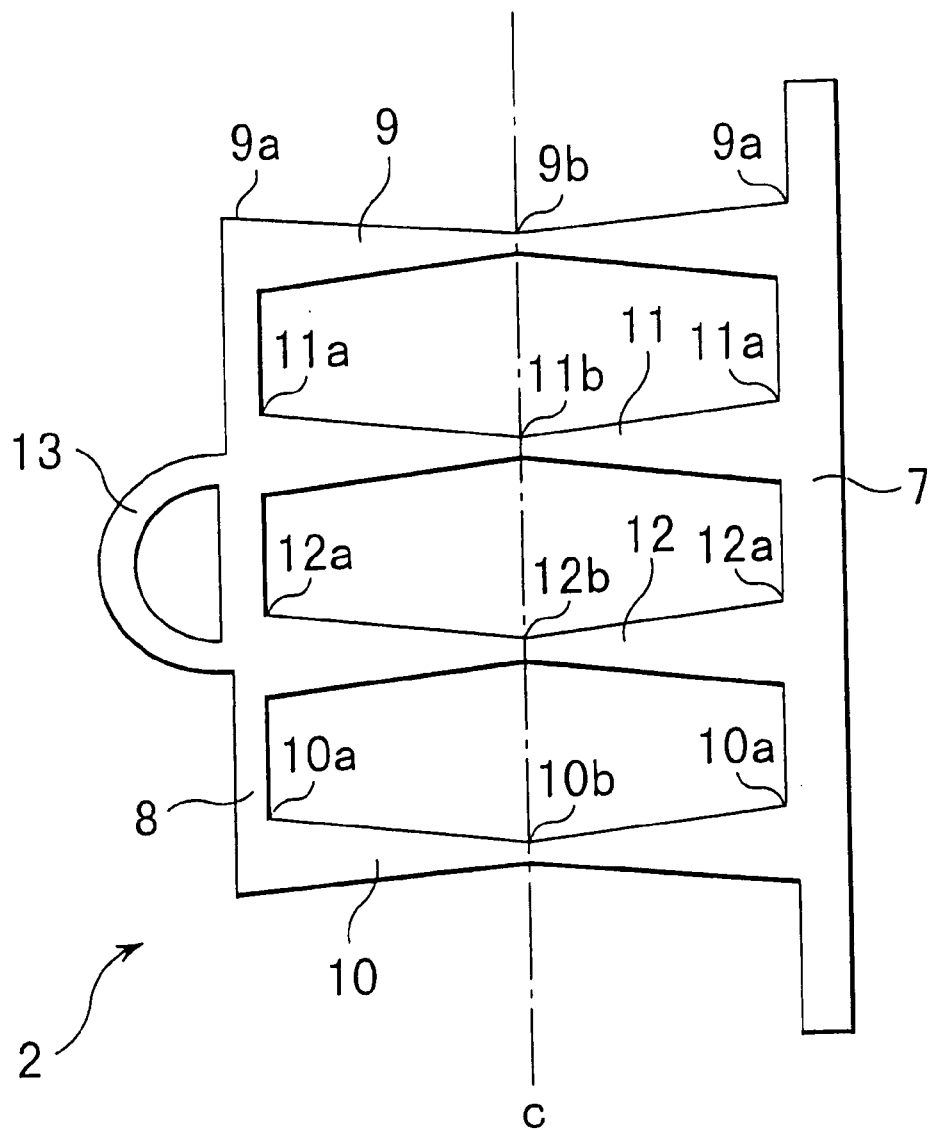
FIG. 2 is a partially sectional view showing a bumper beam of the bumper system of FIG. 1.

FIG. 2 is a sectional view of the bumper beam 2 as seen in the transverse direction or from the side of the vehicle. The bumper beam 2 is formed by an extruded or drawn aluminum material and has a box-like closed cross section enclosed by four walls, a rear wall 7, a front wall 8, an upper wall 9 and a lower wall 10. The rear wall 7 is secured to the beam stay 6. The front wall 8 disposed opposite to the rear wall 7 supports the urethane foam 3. These front and rear walls 8, 7 are respectively connected by the upper wall 9 and the lower wall 10.

Further, the closed cross section enclosed by four walls 7, 8, 9 and 10 has two webs 11, 12 for interconnecting the front and rear wall, 8 and 9. Two walls 9, 10 and two webs 11, 12 extending in a longitudinal or horizontal direction of the vehicle in FIG. 2, do not have an uniform thickness along the lengthwise direction of the vehicle. The thickness is largest, for example, 3 millimeters, at the connecting sections of the upper and lower walls 9, 10 with the front and rear walls 8, 7, decreases gradually, linearly towards the center thereof and is smallest, for example, 1.5 to 2.0 millimeters, in the neighborhood of the central sections 9b, 10b, 11b and 12b. In other words, the wall sections 9, 10 and the web sections 11, 12 are provided with yieldable portions 9b, 10b, 11b, 12b which are apt to be deformed, respectively. These yieldable portions, as shown in FIG. 2, are located on an identical line C passing through near the center of the bumper beam 2.

Further, a protruding portion 13 is integrally formed on the front wall 8. The protruding portion 13 is formed by protruding a part of a central portion of the front wall 8 toward the front of the vehicle.

In the bumper beam 2 thus constituted, the yieldable portions 9b, 10b, 11b, 12b enable a stable generation of buckling in the event of impact. As described before, since the yieldable portions 9b, 10b, 11b, 12b having a small thickness are formed in the central part of the bumper beam 2, when the vehicle has a collision, the buckling of the bumper beam 2 starts to generate from these yieldable portions. That is, the yieldable portions operate like buckling starting points. Further, since the yieldable portions 9b, 10b, 11b, 12b are located on the center line C of the bumper beam 2, such a buckling as deforming the bumper beam 2 in the longitudinal direction (from front to rear), like bellows can be generated in a relatively stable manner regardless of vehicle attitudes or load input direction. Thus, since positions where the buckling starts to generate are determined beforehand, an inappropriate generation of buckling, such as a rhomboid deformation, can be prevented and an effective absorption of impact energy in the bumper beam 2 is available.

The protruding portion 13 formed on the front wall 8 enables an air bag to deploy at an earlier timing in the event of impact. For example, considering a light collision, first impact load is absorbed by the compression of the urethane foam. In case where the impact load is more than the urethane foam can absorb, resistance forces are generated in the bumper beam, the beam stay and the body frame in this order to absorb impact energy. At this moment, in case where the resistance force of the body frame exceeds a specified value, for instance, in case where an acceleration sensor installed in the body frame detects an impact acceleration larger than a specified value, the air bag is operated for deployment.

However, in case of the prior bumper beam having no protruding portion in the front, since the bumper beam does not generate a resistance force, until the urethane foam is completely compressed or until the energy absorption of the urethane foam is finished, it has been difficult to deploy the air bag at an earlier timing.

On the other hand, in case of the bumper beam 2 according to the embodiment of the present invention, since the protruding portion 13 is formed at the front of the bumper beam 2, the bumper beam 2 generates resistance force before the urethane foam 3 is completely compressed. That is, resistance force is generated in the bumper beam 2 earlier than the bumper beam of the prior art, consequently an early deployment of the air bag is available. The height of the protruding portion 13 is preferably established to a larger value (for example, 10 millimeters) than a residual width of the urethane foam 3 in a completely compressed state of the urethane foam 3.

In the aforegoing embodiment, all of the walls or webs extending longitudinally have the yielding portions, however, it is not necessary to form yielding portions in all of walls or webs. From the view point of giving a buckling starting point, yielding portions are preferably formed at least in webs.

Figure 3:
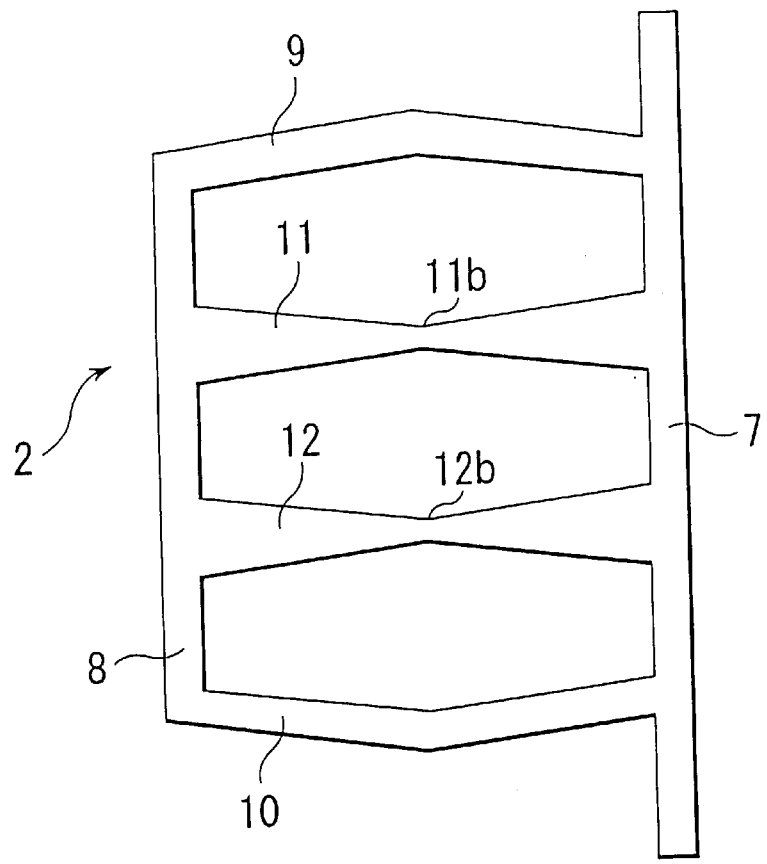
FIG. 3 is a sectional view showing a variation of bumper beams.

FIG. 3 is a sectional view showing a variation of bumper beams. As seen from the drawing, the yielding portions are formed only in the webs 11, 12 but are not formed in the upper wall 9 and lower wall 10. Further, these upper and lower walls 9, 10 have a uniform thickness and are slightly bent outwardly.

Figure 4:
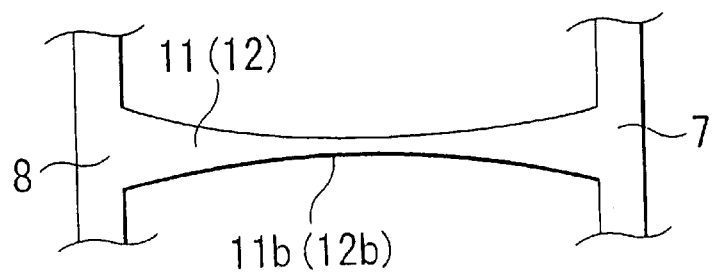
FIG. 4 is a partially sectional view showing a variation bumper beams.
Figure 5:
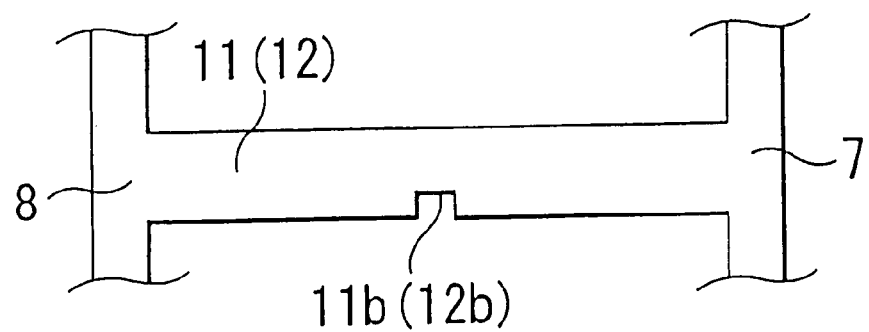
FIG. 5 is a partially sectional view showing a variation bumper beams.
Figure 6:
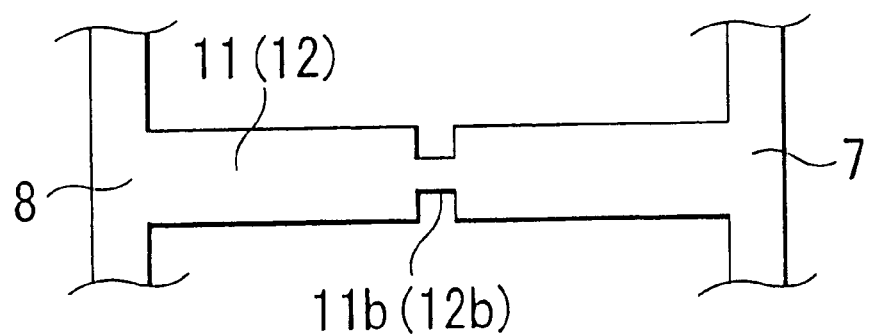
FIG. 6 is apartially sectional view showing a variation of bumper beams.

Thus constituted bumper beam 2 is subjected to such a buckling deformation that the yielding portions 11b, 12b are buckled in the outward direction of the bumper beam 2. Accordingly, the bumper beam 2 can be prevented from the rhomboid deformation and can be expected to have an efficient energy absorption. In the embodiment described before, the yielding portion has been defined as a portion whose thickness is smallest in the upper and lower walls or the webs connecting the front and rear walls. However, considering that the yielding portion has a function as a buckling starting point, namely, a point from which a buckling starts to generate, the yielding portion is not limited to the portion having a smallest thickness. For example, as indicated in FIG. 4, the webs 11, 12 may be formed such that their thickness is largest at both connecting portions with the front and rear walls 8, 7, it becomes gradually small along a curved line as it goes from both connecting portions to the center thereof, and it is smallest in the neighborhood of the center of the webs 11, 12. Further, as indicated in FIG. 5, notches 11b, 12b may be provided in the neighborhood of the webs 11, 12 on either of the upper or lower sides thereof. Further, as shown in FIG. 6, notches 11b, 12b may be provided on both of the upper and lower sides thereof.

Further, it is not always necessary to provide the yieldable portions in the center of the bumper beam 2. That is, the yieldable portions may be provided in an offsetting manner on either of left or right sides of the bumper beam 2. Since the yieldable portion is for giving a starting point of buckling in itself, what extent the yieldable portion is offset from the center of the bumper beam is dependant upon what is a most desirable buckling. Therefore, the yieldable portion defined in the present invention is not limited to that provided in the neighborhood of the center of the bumper beam. It should be noted that the position of the yieldable portion in the present invention includes a wider range.

Figure 7:
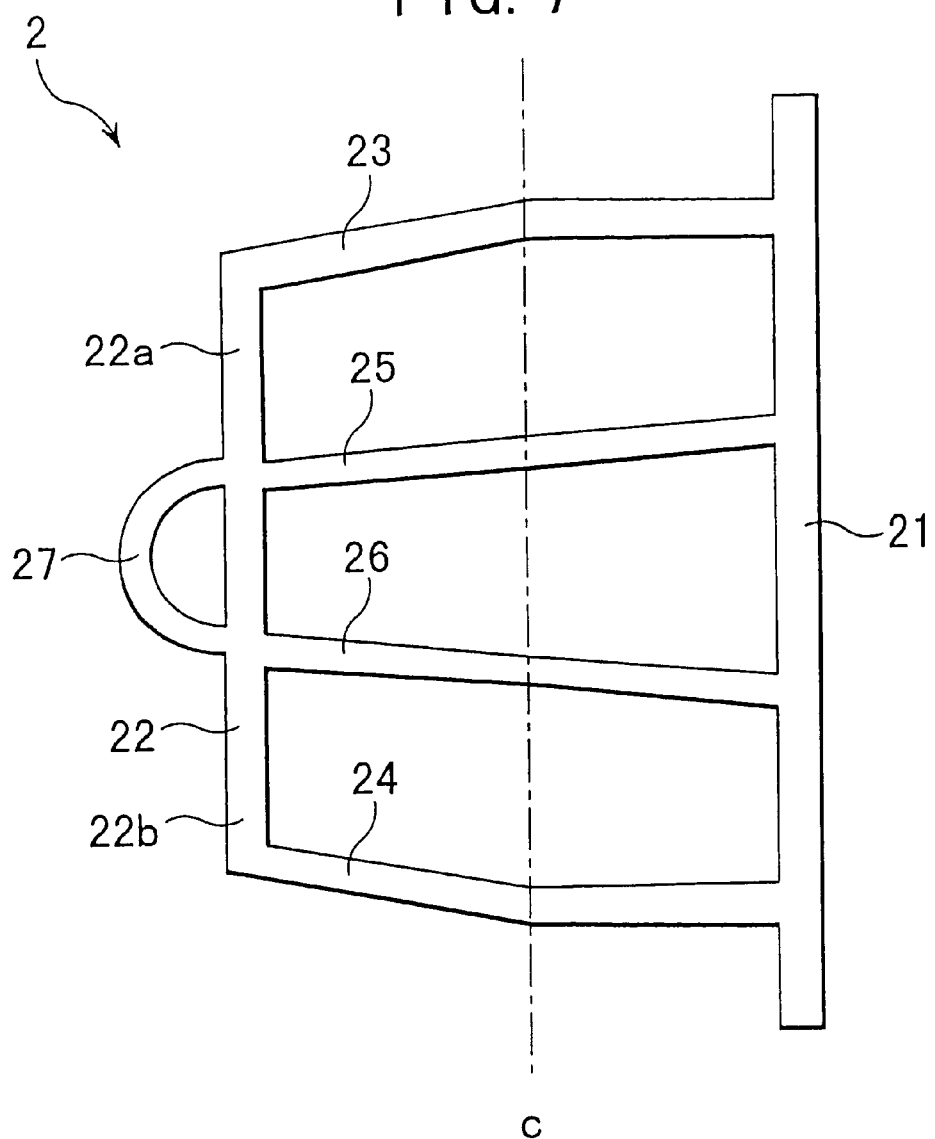
FIG. 7 is a sectional view showing a variation of bumper beams.
Figure 8:
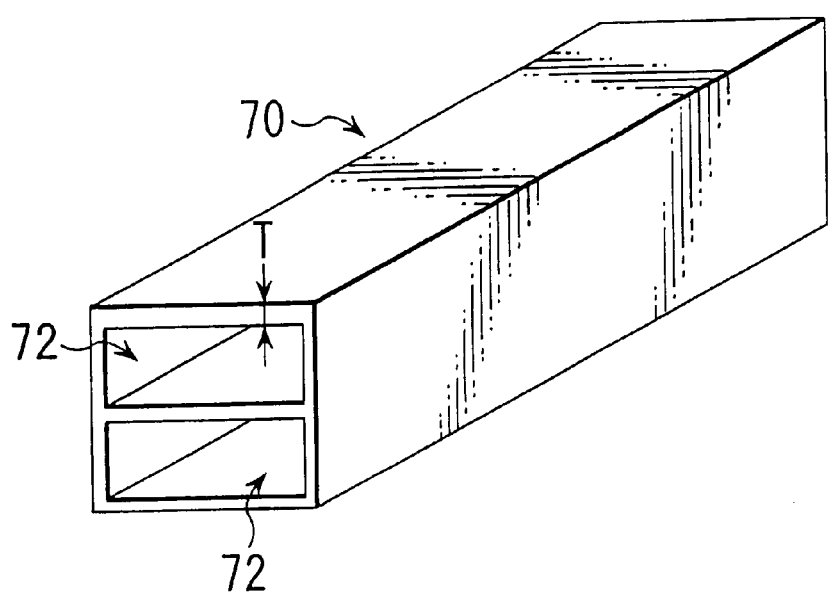
FIG. 8 is a perspective view showing a bumper beam according to a prior art.
Figure 9:
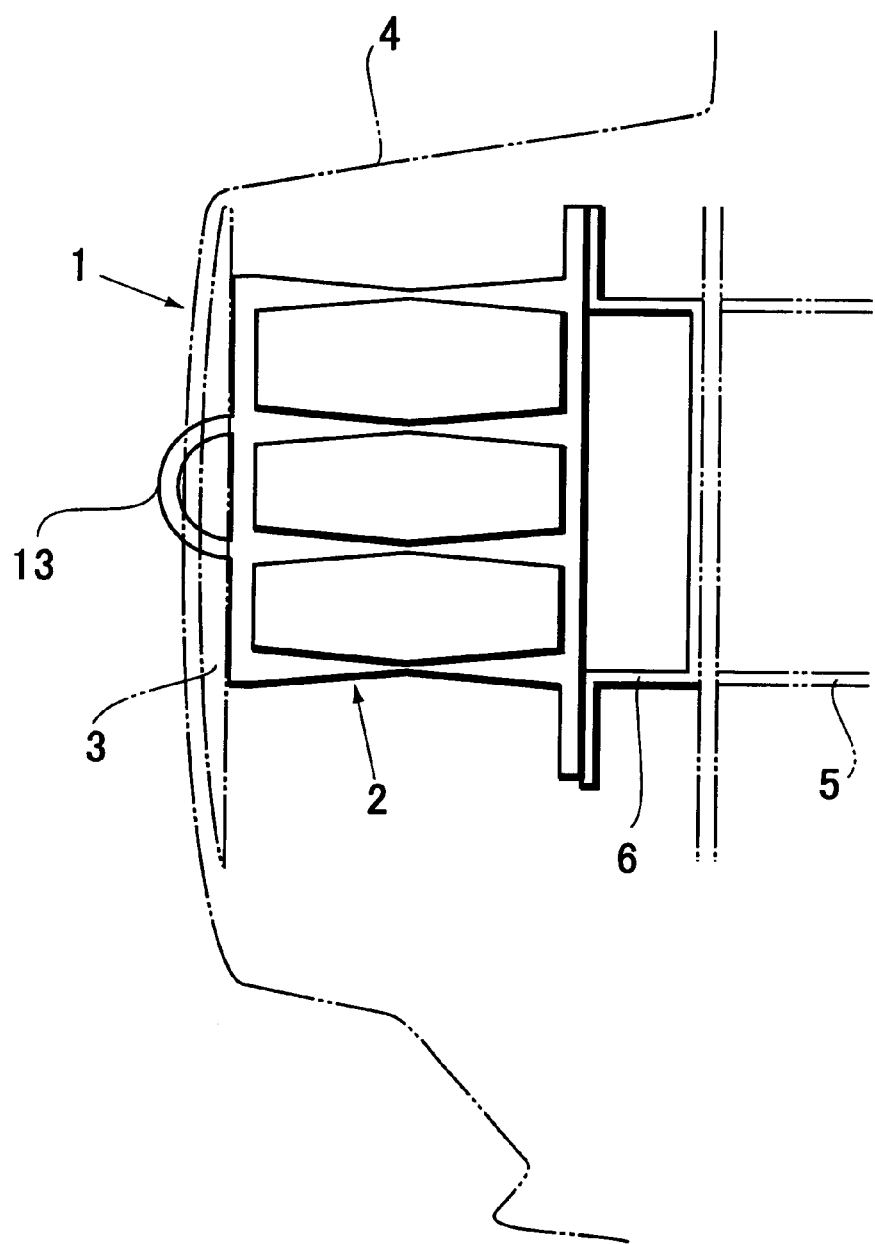
FIG. 9 is a sectional view showing the bumper system of FIG. 1 wherein the bumper protruding portion is larger than a residual compressed width of the energy absorbing medium.

FIG. 7 is a sectional view showing a bumper beam according to another embodiment. The bumper beam 2 of this embodiment is formed by aluminum material having a uniform thickness of 3 millimeters or thereabout and it has no such yieldable portions as described above. A front wall 22 is divided into an upper front wall 22a and a lower front wall 22b which are provided opposite to a rear wall 21. The upper front wall 22a is connected with the rear wall 21 through an upper wall 23 and a web 25. Further, the lower front wall 22b is connected with the rear wall 21 through a lower wall 24 and a web 26. Further, these upper and lower front walls 22a, 22b are connected with a protruding portion 27 projected forwardly, respectively. That is, the webs 25, 26 are connected with each other through the protruding portion 27.

The upper wall 23 gradually expands outwardly (upwardly in the drawing) between the upper front wall 22a and the center line C of the bumper beam 2 and extends horizontally between the center line C and the rear wall 21. Further, the lower wall 24 gradually expands outwardly (downwardly in the drawing) between the lower front wall 22b and the center line C of the bumper beam 2 and extends horizontally between the center line C and the rear wall 21. That is, the interval between the upper and lower walls 23, 24 becomes large gradually from the front of the vehicle toward the center of the bumper beam 2 and is kept constant between the center line C and the rear wall 21. On the other hand, two webs 25, 26 are disposed slantingly in the longitudinal direction of the vehicle such that the interval therebetween becomes gradually large from the front toward the rear of the vehicle.

Thus constituted bumper beam 2 can generate an appropriate buckling in a stable manner in the event of collision. Since the upper front wall 22a is connected with the lower front wall 22b through the protruding portion 27, when an input load is applied to the protruding portion 27, stress is concentrated on the webs 25, 26 and as a result the webs 25, 26 start to be deformed. At this moment, since stress is concentrated on respective refracting points of the upper and lower walls 23, to start with the refracting points, the buckling of the bumper beam 2 goes on. Hence, an appropriate buckling deformation, i.e., a bellows-like deformation of the bumper beam 2 can be generated in a relatively stable manner without depending on the vehicular attitudes, the way of load input and the like. As a result, the bumper beam 2 can absorb effectively the impact energy imparted from a collision.

Further, providing the yieldable portions on the webs 25, 26 along the center line C enhances a stability of buckling.

While the presently preferred embodiments of the present invention have been shown and described, it is to be understood that these disclosures are for the purpose of illustration and that various changes and modifications may be made without departing from the scope of the invention as set forth in the appended claims.

What is claimed is:
1. A bumper beam for a vehicle extending transversely and having a box-like closed cross section, comprising:
    a front wall provided on the front side of said vehicle;
    a rear wall provided on the rear side of said vehicle;
    a plurality of horizontal walls connecting said front wall and said rear wall and at least one of said horizontal walls having a smaller thickness in the neighborhood of a center thereof than a thickness in the neighborhood of connecting points thereof with said front wall and said rear wall respectively.

2. The bumper beam according to claim 1, wherein said thickness of said horizontal walls becomes gradually small from said connecting points toward said center.

3. A bumper beam for a vehicle extending transversely and having a box-like closed cross section, comprising:

a front wall provided on the front side of said vehicle;

a rear wall provided on the rear side of said vehicle;

a plurality of horizontal walls connecting said front wall and said rear wall; and at least one yieldable portion of a smaller thickness provided on said horizontal walls so as to start a buckling of said bumper beam therefrom.

4. The bumper beam according to claim 3, said yieldable portion is located on a line passing through near the center of said bumper beam, as seen from the side of said vehicle.

5. A bumper beam for a vehicle extending transversely and having a box-like closed cross section, comprising:

a front wall provided on the front side of said vehicle;

a rear wall provided on the rear side of said vehicle;

a plurality of horizontal walls of a nonuniform thickness connecting said front wall and said rear wall; and a protruding portion formed by protruding a part of a central portion of said front wall and projecting in the forward direction of said vehicle.

6. A bumper beam for a vehicle extending transversely and having a box-like closed cross section, comprising:

a front wall provided on the front side of said vehicle;

a rear wall provided on the rear side of said vehicle;

an upper wall connecting said front and rear walls and gradually extending upwardly from said front wall to a center line of said bumper beam and horizontally extending to said rear wall, and a lower wall connecting said front and rear walls and gradually extending downwardly from said front wall to a center line of said bumper beam and horizontally extending to said rear wall.

7. A bumper beam for a vehicle having an energy absorbing medium for absorbing an impact energy in an event of collision and a bumper beam provided in a transverse direction of said vehicle, said bumper beam comprising:

a front wall provided on the front side of said vehicle;

a rear wall provided on the rear side of said vehicle;

a plurality of horizontal walls of a nonuniform thickness connecting said front and rear walls; and a protruding portion formed by protruding a part of a central portion of said front wall and projecting within said energy absorbing medium in a forward direction of said vehicle.

8. The bumper system according to claim 7, wherein the height of said protruding portion is larger than a residual width of said energy absorbing medium when said energy absorbing medium is completely compressed.

* * * * *